United States Patent
Phan

(10) Patent No.: US 10,221,359 B2
(45) Date of Patent: Mar. 5, 2019

(54) BIOMASS TREATMENT PROCESS AND APPARATUS

(71) Applicant: Anthony Phan, Shatin (HK)

(72) Inventor: Anthony Phan, Shatin (HK)

( * ) Notice: Subject to any disclaimer, the term of this patent is extended or adjusted under 35 U.S.C. 154(b) by 190 days.

(21) Appl. No.: 15/270,963

(22) Filed: Sep. 20, 2016

(65) Prior Publication Data

US 2018/0079965 A1   Mar. 22, 2018

(51) Int. Cl.

| | |
|---|---|
| *C10B 49/02* | (2006.01) |
| *C10B 21/18* | (2006.01) |
| *C10B 41/00* | (2006.01) |
| *C10B 49/08* | (2006.01) |
| *C10B 53/08* | (2006.01) |
| *C10B 57/10* | (2006.01) |
| *C10B 57/14* | (2006.01) |
| *C10B 49/06* | (2006.01) |
| *C10L 9/08* | (2006.01) |

(52) U.S. Cl.
CPC .............. *C10B 49/02* (2013.01); *C10B 21/18* (2013.01); *C10B 41/00* (2013.01); *C10B 49/06* (2013.01); *C10B 49/08* (2013.01); *C10B 53/08* (2013.01); *C10B 57/10* (2013.01); *C10B 57/14* (2013.01); *C10L 9/083* (2013.01); *Y02E 50/10* (2013.01); *Y02E 50/14* (2013.01); *Y02E 50/15* (2013.01); *Y02E 50/30* (2013.01); *Y02P 20/145* (2015.11)

(58) Field of Classification Search
CPC ......... C10B 21/18; C10B 41/00; C10B 49/02; C10B 49/06; C10B 49/08; C10B 53/08; C10B 57/10; C10B 57/14
See application file for complete search history.

(56) References Cited

U.S. PATENT DOCUMENTS

| | | | | |
|---|---|---|---|---|
| 4,728,339 A | * | 3/1988 | Koppelman | ............. C10B 7/02 422/142 |
| 8,276,289 B2 | * | 10/2012 | Causer | .................... C10B 49/02 122/22 |

(Continued)

FOREIGN PATENT DOCUMENTS

| | | |
|---|---|---|
| CN | 101028744 A | 9/2007 |
| CN | 104194811 A | 12/2014 |

(Continued)

OTHER PUBLICATIONS

United Kingdom Combined Search and Examination Report, dated Sep. 28, 2017, for United Kingdom Application No. 1713961.9.

(Continued)

*Primary Examiner* — Jonathan Miller
(74) *Attorney, Agent, or Firm* — Birch, Stewart, Kolasch & Birch, LLP

(57) ABSTRACT

A process and apparatus are provided in the present invention for treatment of particulate biomass. The present process comprises a densification stage, a first treatment stage, a second treatment stage, a cooling stage; the present apparatus comprises a thermo-chemical treatment chamber which is a two-stage compact moving bed type including two compartments for pre-torrefaction and torrefaction and having a star or spider or ring formic hot gas distribution system equipped with at least one hot gas input and at least one hot gas output for each compartment, and at least one particulate biomass inlet and at least one particulate biomass outlet.

42 Claims, 13 Drawing Sheets

(56) References Cited

U.S. PATENT DOCUMENTS

| | | | |
|---|---|---|---|
| 8,322,056 B2 * | 12/2012 | Causer | C10B 49/02 122/22 |
| 8,869,425 B2 * | 10/2014 | Perry | B29B 17/02 110/212 |
| 9,057,037 B2 | 6/2015 | Camper et al. | |
| 9,062,255 B2 * | 6/2015 | DePouli | C10B 7/02 |
| 9,085,494 B2 | 7/2015 | Retsina et al. | |
| 9,096,800 B2 | 8/2015 | Shu et al. | |
| 9,115,314 B2 | 8/2015 | Boon et al. | |
| 9,127,227 B2 | 9/2015 | Brock et al. | |
| 9,149,779 B2 | 10/2015 | Van Der Ploeg | |
| 9,150,791 B2 | 10/2015 | Ben-Tovim | |
| 9,181,489 B2 | 11/2015 | Liang | |
| 9,193,916 B2 | 11/2015 | Bar-Ziv et al. | |
| 9,206,368 B2 | 12/2015 | Breneman et al. | |
| 9,217,111 B2 | 12/2015 | Harris et al. | |
| 9,238,779 B2 | 1/2016 | Gosselink et al. | |
| 9,260,666 B2 | 2/2016 | Aelion et al. | |
| 9,347,011 B2 | 5/2016 | Bergman | |
| 9,464,245 B2 * | 10/2016 | Gao | C10B 49/10 |
| 9,562,194 B2 * | 2/2017 | Kellens | C10B 23/00 |
| 2007/0220805 A1 | 9/2007 | Leveson et al. | |
| 2009/0084029 A1 | 4/2009 | Bergman | |
| 2011/0179700 A1 | 7/2011 | Monroe et al. | |
| 2012/0192485 A1 | 8/2012 | Grassi et al. | |
| 2013/0075244 A1 * | 3/2013 | Eyer | C10B 21/02 201/29 |
| 2013/0098751 A1 * | 4/2013 | Eyer | C10B 49/06 201/2 |
| 2013/0105295 A1 * | 5/2013 | Eyer | C10L 9/083 202/99 |
| 2013/0298457 A1 | 11/2013 | Bergman | |
| 2013/0341569 A1 | 12/2013 | Ampulski et al. | |
| 2014/0053458 A1 | 2/2014 | Bar-Ziv et al. | |
| 2014/0115956 A1 | 5/2014 | Dam-Johansen et al. | |
| 2014/0298716 A1 * | 10/2014 | Marty | B01J 8/125 44/629 |
| 2015/0225649 A1 | 8/2015 | Kellens et al. | |
| 2015/0232768 A1 * | 8/2015 | Mason | C10J 3/26 202/97 |
| 2017/0073582 A1 * | 3/2017 | Ershag | C10B 1/04 |

FOREIGN PATENT DOCUMENTS

| | | |
|---|---|---|
| CN | 105542811 A | 5/2016 |
| GB | 2506864 A | 4/2014 |
| KR | 10-1743503 B1 | 6/2017 |
| WO | WO 2009/151367 A1 | 12/2009 |
| WO | WO 2010/001137 A2 | 1/2010 |
| WO | WO 2010/089342 A1 | 8/2010 |
| WO | WO 2014/060438 A1 | 4/2014 |
| WO | WO 2014/066575 A1 | 5/2014 |

OTHER PUBLICATIONS

Canadian Office Action, dated Jan. 5, 2018, for Canadian Application No. 2,979,019.
International Search Report and the Written Opinion of the International Searching Authority (Forms PCT/ISA/220 and PCT/ISA/210), dated Dec. 20, 2017, for International Application No. PCT/CN2017/101891.
British Further Search Report under Section 17(6) for British Application No. 1713961.9, dated May 21, 2018.
Canadian Office Action for Canadian Application No. 2,979,019, dated May 30, 2018.

* cited by examiner

US 10,221,359 B2

BIOMASS TREATMENT PROCESS AND APPARATUS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

There are no related applications

FIELD OF THE INVENTION

The present invention relates to a biomass treatment process and apparatus, including but not limited to a biomass densification and torrefaction system.

BACKGROUND OF THE INVENTION

In order to reduce Green House Gas (GHG) emission, especially at coal fired power plants and heavy industry such as the metallurgy industry, it is possible to generate sustainable energy by co-firing biomass in coal fired furnaces to reduce GHG. However, due to the most coal fired power plants based on pulverized coal furnaces, biomass cannot be co-fired in higher mix percentage in coal-fired power plants without pretreatment because biomass still has fiber structure in its property thus it is not easy to be grinded and pulverized. On the other hand, the energy value of biomass is much lower than coal so a pretreatment of biomass is mandatory to increase the energy density as well as the grindability in order to use the same equipment infrastructure of coal fired power plants. In addition, the wide range of types of biomass from woody base to herbaceous base, to aquatic base prevents a large-scale standardization of biomass, thus a creation of a global market of biomass fuels is difficult to realize. In order to realize a Multiple Input Single Output (MISO) concept of different biomass inputs but only one standard biomass output, densification and pretreatment of biomass are necessary to reach a national and international standardization.

Torrefaction is an incomplete pyrolysis process (FIG. 1) where biomass is under thermo-chemical pretreatment in an oxygen free or low oxygen environment. The final product of torrefied biomass is hydrophobic, has higher energy density and is easy grind-able, matching closer to the coal properties so that co-firing of torrefied biomass in coal fired power plants is much easier, requiring no costly modification or addition of existing equipment infrastructure in coal fired power plants.

On the other hand, torrefied biomass is not easy to be densified in the form of pellets or briquettes using resident lignin acting as a glue because the required high torrefaction temperature reduces the concentration of lignin in torrefied biomass and further increases the glass transition temperature of the resident lignin so that conventional pellet press would have to be operated at higher temperature beyond current technological limits and also at higher energy consumption. In order to facilitate the process of densification for torrefied biomass, external binder is generally added. Unfortunately external binders are usually not hydrophobic so that torrefied pellets or briquettes with additional binders absorb water and de-integrate by themselves when moisture content is high so that it poses logistic and storage problem, especially in rain or snow seasons.

It is known in the prior art that the feedstock needs to be dried completely before torrefaction process could start.

U.S. Pat. No. 9,347,011 teaches a torrefaction system with two separate torrefaction treatment devices of different process technologies wherein the first treatment device is mainly to dry the wet non-densified biomass while the second treatment device performs the torrefaction. The first treatment device is of a fluidized bed reactor type which has a limited feedstock flexibility and is optimized to process mainly woody biomass such as sawdust. On the other hand, the feedstock for the said torrefaction system has to be non-densified biomass because densified biomass in the form of pellets or briquettes is not suitable for fluidized bed reactor. Further densification after torrefaction in the form of pellets or briquettes is energy consuming and may require additional binders which in general are not hydrophobic.

U.S. Pat. No. 9,206,368 teaches a mass flow torrefaction reactor of one single treatment stage. The downside of this conventional reactor type is the "tunneling effect", especially when upscaling to a large size reactor for higher mass production throughput, where hot gas coming from the bottom of the reactor chamber may find some short cuts through the biomass to the closest gas discharge outlet and thus creating different hot and cold zones within the reactor chamber leading to non-uniform quality of torrefied biomass. On the other hand, the control of torrefaction parameters of temperature, oxygen content and residence time for one single treatment stage are not flexible enough to deal with different varieties of biomass associated with different properties and moisture contents so the MISO concept is almost impossible to be realized. Furthermore, the feedstock for the said torrefaction system is non-uniform and non-densified biomass "having 25% or less moisture content and with a size of from about 13 mm to about −75 mm in the longest dimension" so that densification after torrefaction in form of uniform pellets or briquettes is energy consuming and may require additional binders which in general are not hydrophobic.

Therefore, it is an unmet need to improve torrefaction systems of the prior arts with the present invention.

SUMMARY OF THE INVENTION

The afore-mentioned need is met by various aspects and embodiments disclosed herein.

It is one of the objectives of the present invention to densify the biomass in form of uniform pellets or briquettes first before entering into the torrefaction stage in order to avoid the use of additional binder for densification if the densification stage of pelletizing and briquetting is done after the torrefaction stage. On the other hand, densified biomass from different feedstock has a common uniform size which could be optimized for the torrefaction in a two-stage compact moving bed reactor type with corresponding controlled torrefaction parameters for each of the densification and torrefaction stages in order to realize the MISO concept.

It is another objective of the present invention to provide a cost-effective torrefaction process and apparatus for producing economical torrefied pellets or briquettes with hydrophobic characteristic without using binders, easy upscaling to commercial mass production with a continuous torrefaction process based on affordable equipment and the possibility to adapt to MISO concept without major modification of the existing equipment at coal fired power plants.

It is yet another objective of the present invention to avoid "tunneling effect" and different residence times for each biomass pellet or briquette in a compact moving bed torrefaction reactor which causes non-homogenous torrefied products. The present invention provides a hot air distribution system in star or spider or ring form which minimizes the "tunneling effect", thus hot air is evenly in contact with all biomass at the same setting temperature within the torrefaction treatment chamber. The wiper arm at the top of the torrefaction treatment chamber distribute evenly the input biomass and the biomass discharge device at the end of the treatment chamber regulate the throughput of torrefied biomass evenly in order to keep the residence time constant for each pellet or briquette going through the whole top-down of the said treatment chamber. The torrefaction chamber of the invented compact moving bed reactor is further divided into a first treatment stage (pre-torrefaction stage) and a second treatment stage (torrefaction stage) in order to cope with diverse biomass associated with their properties and moisture content, thus a MISO concept could be easier to achieve with the present invention.

Accordingly, the first aspect of the present invention relates to a process for treating biomass comprising a densification stage, a first treatment stage, a second treatment stage, and a cooling treatment stage. Said densification stage comprises feeding substantially dried and size-reduced biomass to a continuous or batch biomass treatment system, wherein said biomass contains an amount of moisture. In one embodiment, said amount of moisture contained in said biomass ranges from 8% wt. to 12% wt. Said densification stage further comprises densifying said biomass into a form of pellets or briquettes. Said densification stage additionally comprises discharging the densified biomass which is in the form of pellets or briquettes to said first treatment stage. Said first treatment stage comprises heating said densified biomass containing said amount of moisture to a pre-torrefaction temperature for a first residence time. In one embodiment, said pre-torrefaction temperature used in said first treatment stage ranges from 260 to 300° C. Said biomass can be further dried or completely dried by evaporating said moisture from said biomass through said heating in said first treatment stage such that said biomass becomes at least a partially torrefied biomass or pre-torrefied biomass after said heating. Said pre-torrefied biomass is then discharged from said first treatment stage to said second treatment stage. Said second treatment stage comprises heating said pre-torrefied biomass to a torrefaction temperature for a second residence time. In one embodiment, said torrefaction temperature used in said second treatment stage ranges from 240 to 280° C. Said second residence time can be equal to or longer than said first residence time. In one embodiment, the actual residence time for the first and the second residence time of the present process depend on the corresponding heights of the compartments where the first and second treatment stages are carried out, and also the torrefied biomass output rate after torrefaction at the second treatment stage. Said pre-torrefied biomass after said heating in said second treatment stage becomes torrefied biomass and said torrefied biomass is then discharged from said second treatment stage to said cooling treatment stage. Said cooling treatment stage comprises cooling said torrefied biomass to a temperature of below 100° C. In one embodiment, said torrefied biomass is cooled down by said cooling in said cooling treatment stage to about room temperature. In another embodiment, said cooling in said cooling treatment stage is carried out by bringing said torrefied biomass into direct contact with a coolant gas. In other embodiment, said cooling in said cooling treatment stage is carried out by bringing said torrefied biomass into direct contact with water. In an exemplary embodiment, said first and second treatment stages of the present method are carried out in the same torrefaction apparatus, which is different from the conventional methods that are carried out in two separate apparatuses. Said first and second treatment stages are provided with a first hot gas and a second hot gas, respectively, for reaching said first and second treatment temperatures. In one embodiment, said first hot gas is at least provided to said first treatment stage by at least one first hot gas inlet and the remaining thereof is at least discharged from said first treatment stage by at least one first hot gas outlet. In another embodiment, said second hot gas is at least provided to said second treatment stage by at least one second hot gas inlet and the remaining thereof is at least discharged from said second treatment stage by at least one second hot gas outlet. Said second hot gas at said second hot gas inlet(s) has a temperature being equal to or lower than that of said first hot gas at said first hot gas inlet(s). Said first hot gas and/or second hot gas may comprise oxygen. In one embodiment, said first hot gas is in direct contact with said densified biomass being fed into said first treatment stage, wherein said first hot gas comprises oxygen equal to or less than 10% by volume. In another embodiment, said second hot gas is in direct contact with said pre-torrefied biomass being fed into said second treatment stage, wherein said second hot gas comprises oxygen equal to or less than 3% by volume. The remaining portion of said first hot gas and/or the remaining portion of said second hot gas which contains volatile combustible gas after said first and/or second treatment stage(s) can be re-circulated. In one embodiment, said remaining portion of said first hot gas being discharged through said first hot gas outlet(s) after said first treatment stage is re-circulated to a combustion burner for producing a flue gas which is for heating up the first hot gas via one or more heat exchange(s) to be subsequently provided to said first treatment stage through said first hot gas inlet(s). In another embodiment, said remaining portion of said second hot gas being discharged through said second hot gas outlet(s) after said second treatment stage is re-circulated to a combustion burner for producing a flue gas which is for heating up the second hot gas via one or more heat exchange(s) to be subsequently provided to said second treatment stage through said second hot gas inlet(s). Said combustion burner can be the same or different for said flue gas which is for heating up the first and second hot gases, respectively, via heat exchange(s). Optionally, the flue gas out of the heat exchange(s) could also provide heat to other stages such as prior to said densification stage, the flue gas heat from the heat exchange step can be used for reducing the moisture content of the biomass to a range of 8 wt. % to 12 wt. % before the introducing to the densification step of pelletizing or briquetting. By re-circulation of the remaining portion of the first and/or second hot gas to said combustion burner via said one or more heat exchange(s), the present process can be self-sustained after being provided with the initial first and second hot gas to the first and second treatment stages.

Said process in the first aspect of the present invention further comprises a monitoring and controlling step via a control system for monitoring and/or controlling one or more of the following parameters: actual moisture content in the biomass at different stages of said process, actual oxygen content of the hot gas in compartments for the first and second treatment stages, actual temperature of the chambers, and/or actual time for the first and second residence time, to ensure that all the critical parameters meet the pre-determined torrefaction conditions. Said monitoring and controlling step of said process in the first aspect of the present invention can be carried out by a system having sensors and control devices.

According to an embodiment of the first aspect of the present invention, the continuous or batch biomass treatment system that is used to perform the process is a compact moving bed reactor.

In the second aspect of the present invention, it is provided a continuous or batch biomass treatment apparatus comprises a treatment chamber. In an exemplary embodiment, said treatment chamber is a compact moving bed reactor type. Said treatment chamber preferably comprises a double-walled housing, and is preferably in an annular form, which defines a substantially vertical axis. Said treatment chamber comprises a first treatment compartment and a second treatment compartment. Said treatment chamber further comprises at least one gas sealed valve inlet being disposed at the top of said treatment chamber for supplying substantially dried and densified biomass into the chamber; a biomass distribution device; a biomass discharge device being disposed at the bottom of said treatment chamber for evenly discharging torrefied biomass which is in particle form; at least one gas sealed valve outlet as the final torrefied biomass outlet; at least one first hot gas inlet and at least one first hot gas outlet for providing a first hot gas to the first treatment compartment of the treatment chamber and discharging the remaining portion of the first hot gas from the first treatment compartment of the treatment chamber for re-circulating, respectively; at least one second hot gas inlet and at least one second hot gas outlet for providing a second hot gas to the second treatment compartment of the treatment chamber and discharging the remaining portion of the second hot gas from the second treatment compartment of the treatment chamber for re-circulating, respectively; an outer wall and an inner perforated wall of the double-walled housing, wherein between said outer wall and inner perforated walls an inner peripheral gap is defined; a hot gas distribution system comprising a plurality of perforated double separation plates being arranged in a star or spider or ring form; at least one perforated duct being disposed in the middle of the treatment chamber. In one embodiment, said inner perforated wall, said system of perforated double separation plates and said at least one perforated duct raise from the bottom to the top of the treatment chamber along the vertical axis. In a preferred embodiment, the first hot gas inlet(s) is/are mounted at the top of the first treatment compartment of the treatment chamber. The first hot gas is provided through the first hot gas inlet(s), then forced along the inner peripheral gap of the double-walled housing and the gap of the inner perforated double separation plates being arranged in a star or spider or ring form in order to heat up evenly all the biomass fed into the first treatment compartment of the treatment chamber to a pre-determined temperature for a first residence time. After that, the remaining portion of the first hot gas after the first treatment stage is recuperated through the perforated duct in the middle of the treatment chamber and discharged by the at least one first hot gas outlet. Preferably, the at least one first hot gas outlet is mounted at the bottom of the first treatment compartment for recuperating the remaining portion of the first hot gas in order to re-circulate the heat from the remaining portion of the first hot gas via a heat exchange back to the first treatment compartment. In a preferred embodiment, the second hot gas inlet is mounted at the bottom of the second treatment compartment of the treatment chamber. The second hot gas is provided through the second hot gas inlet(s), then forced along the inner peripheral gap of the double-walled housing and the gap of the inner perforated double separation plates being arranged in a star or spider or ring form in order to heat up evenly all the biomass fed into the second treatment compartment of the treatment chamber to a pre-determined temperature for a second residence time. After that, the remaining portion of the second hot gas after the second treatment stage is recuperated through the perforated duct in the middle of the second treatment compartment and discharged by the at least one second hot gas outlet. Preferably, the at least one second hot gas outlet is mounted at the top of the second treatment compartment for recuperating the remaining portion of the second hot gas in order to re-circulate the heat from the remaining portion of the second hot gas via a heat exchange back to the second treatment compartment. Additionally, the treatment chamber may comprise a control system for monitoring and controlling different parameters according to the pre-determined conditions in each part/section/compartment of the treatment chamber.

According to an embodiment of the second aspect of the present invention, said biomass distribution device comprises at least one rotary wiper arm mounted in a rotated wiper wheel driven by a motor for evenly distributing the densified biomass prior to being discharged into the first treatment compartment via said gas sealed valve inlet.

According to an embodiment of the second aspect of the present invention, said biomass discharge device comprises two coaxed rotated disks driven by at least one rotation motor, wherein each of said coaxed rotated disks has star formic multiple openings and multiple blocks arranged alternatively; said two coaxed rotated disks either rotates in the same or in a counter direction to each other, and at the same or at a different speed, in order to discharge evenly the torrefied biomass from the second treatment compartment according to a controlled output rate.

According to an embodiment of the second aspect of the present invention, the gap of the double-walled housing and the gap of the perforated double separation plates of said first treatment compartment and the gap of the double-walled housing and the gap of the perforated double separation plates of said second treatment compartment are separated by a non-perforated partition plate to avoid any gas or temperature collision between the first and the second treatment compartments or between the first and the second treatment stages while pre-torrefied biomass moves from the first treatment compartment to the second treatment compartment without any blockage.

According to an embodiment of the second aspect of the present invention, said perforated double separation plates which are arranged in a star or spider form comprise at least one first end connected to said perforated duct being disposed in the middle of said treatment chamber.

According to other embodiment of the second aspect of the present invention, said perforated double separation plates which are arranged in a star or spider form comprise at least one second end connected to said inner perforated wall of said treatment chamber.

According to an embodiment of the second aspect of the present invention, each of said perforated double separation plates divides said treatment chamber into at least two vertical sections.

According to an embodiment of the first or second aspect of the present invention, pre-torrefied biomass after being treated at said first treatment stage or in said first treatment compartment are discharged to said second treatment stage or into said second treatment compartment by means of gravity.

According to an embodiment of the second aspect of the present invention, said first hot gas from said first hot gas inlet(s) comprises equal to or less than 10% by volume of oxygen.

According to an embodiment of the second aspect of the present invention, said second hot gas from said second hot gas inlet(s) comprises equal to or less than 3% by volume of oxygen.

According to an embodiment of the second aspect of the present invention, said pre-determined temperature in said first treatment compartment ranges from 260 to 300° C.

According to an embodiment of the second aspect of the present invention, said pre-determined temperature in said second treatment compartment ranges from 240 to 280° C.

According to an embodiment of the second aspect of the present invention, said second hot gas is maintained at a temperature which is equal to or lower than that of said first hot gas.

According to an embodiment of the second aspect of the present invention, said second treatment compartment has a height which is equal to or taller than that of said first treatment compartment.

According to an embodiment of the first or second aspect of the present invention, the duration of said first and second residence time for the first and second treatment stages or for the biomass being treated in the first and second treatment compartment, respectively, are dependent on the height of the first and second treatment compartments and/or the controlled output rate of said biomass discharge device.

According to an embodiment of the first or second aspect of the present invention, said control system comprises sensors and control devices for real-time monitoring and controlling the moisture content, the oxygen content, the temperature and the residence time to ensure that all parameters are conformed with the predetermined conditions in each of the stages or compartments.

The present invention includes all of the steps and features referred to or indicated in the specification, individually or collectively, and any and all combinations or any two or more of the steps or features. The present invention also includes all such variation and modifications as described herein.

Other aspects and advantages of the present invention will be apparent to those skilled in the art from a review of the ensuing description.

These and other examples and features of the present invention and methods will be set forth in part in the following Detailed Description. This Summary is intended to provide an overview of the present invention, and is not intended to provide an exclusive or exhaustive explanation. The Detailed Description below is included to provide further information about the present disclosures and methods.

BRIEF DESCRIPTION OF THE DRAWINGS

The above and other objects and features of the present invention will become apparent from the following description of the invention, when taken in conjunction with the accompanying drawings, in which.

DEFINITIONS

Figure 1:
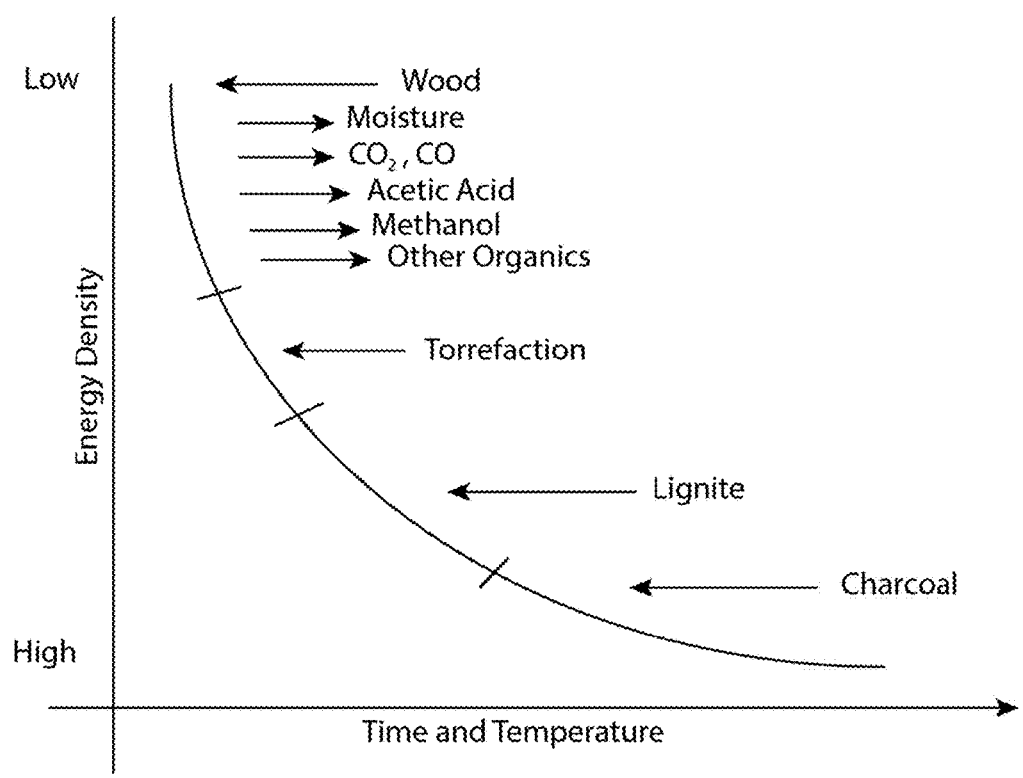
FIG. 1 is a curve showing a general relationship between energy density and time and temperature required at different stages of a pyrolysis process of woody biomass.

As described herein, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

The term "about" can allow for a degree of variability in a value or range, for example, within 10%, or within 5% of a stated value or of a stated limit of a range.

The term "independently selected from" refers to referenced groups being the same, different, or a mixture thereof, unless the context clearly indicates otherwise. Thus, under this definition, the phrase "X1, X2, and X3 are independently selected from noble gases" would include the scenario where, for example, X1, X2, and X3 are all the same, where X1, X2, and X3 are all different, where X1 and X2 are the same but X3 is different, and other analogous permutations.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range.

Throughout the present specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the present invention.

Furthermore, throughout the present specification and claims, unless the context requires otherwise, the word "include" or variations such as "includes" or "including", will be understood to imply the inclusion of a stated integer or group of integers but not the exclusion of any other integer or group of integers.

In the methods of biomass treatment described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "biomass" is understood to refer to any organic material, preferably any plants or plant-based organic materials, including but not limited to Woody biomass (e.g., sawdust, forest residues, etc.), Herbaceous biomass (e.g., corn stalks and residues, sugarcane bagasse, sugarcane residues, etc.); Fruit biomass; Aquatic biomass; Blends and mixtures.

Other definitions for selected terms used herein may be found within the detailed description of the present invention and apply throughout. Unless otherwise defined, all other technical terms used herein have the same meaning as commonly understood to one of ordinary skill in the art to which the invention belongs.

DETAILED DESCRIPTION OF THE INVENTION

In the following description, is set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

Figure 2A:
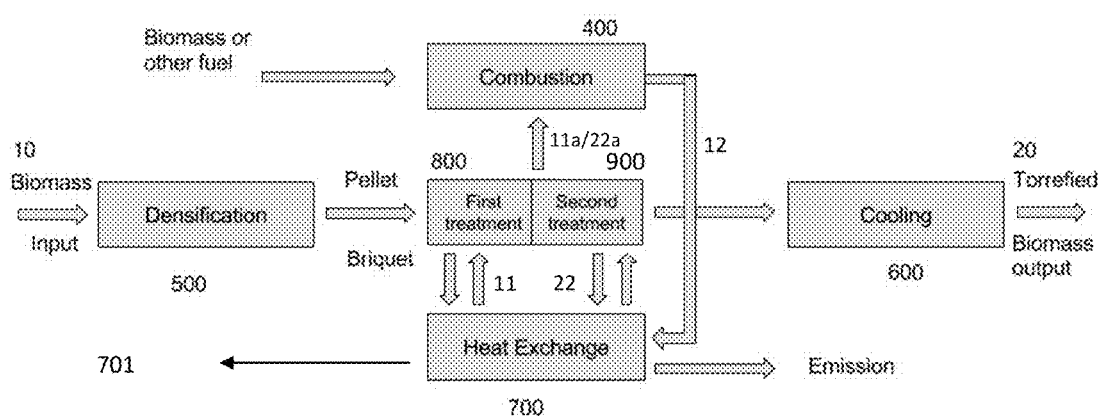
FIG. 2A is a flowchart showing the densification and torrefaction stages of the present process according to an embodiment of the present invention.
Figure 2B:
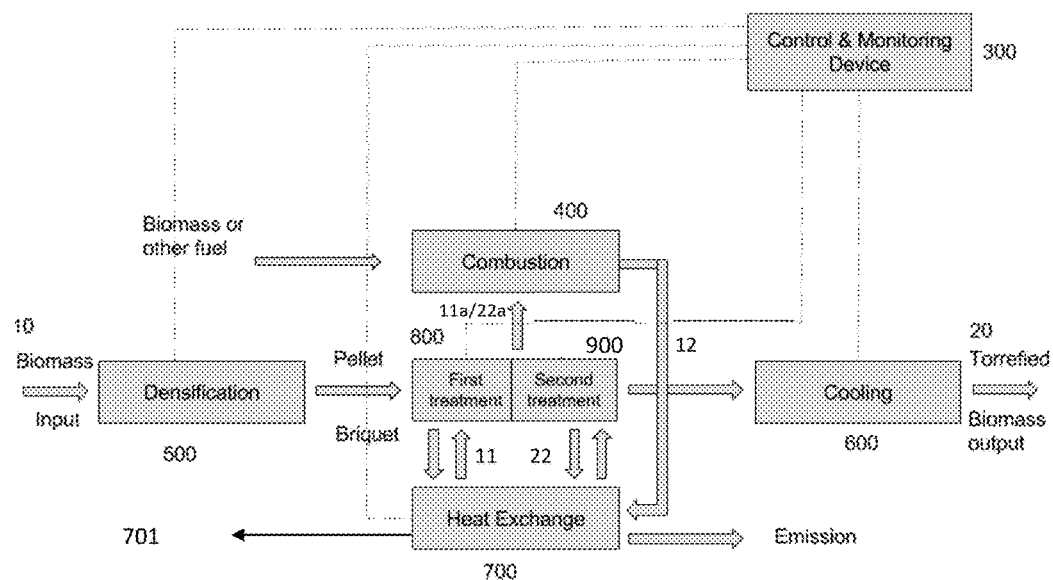
FIG. 2B is another flowchart showing the densification and torrefaction stages of the present process with an additional control and monitoring step according to another embodiment of the present invention.

FIG. 2A shows the process for treating biomass with a continuous or batch biomass treatment system which comprises a densification stage (500), a first treatment stage (800) and a second treatment stage (900), and a cooling treatment stage (600). In FIG. 2B, besides the stages that are illustrated in FIG. 2A, an additional control system (300) having sensors and control devices is incorporated into the process for real-time monitoring and controlling the actual moisture content, the actual oxygen content, the actual temperature, the flow rate of gas, and the residence time, etc. to ensure that all parameters are conformed with the predetermined densification and torrefaction conditions, and in which the process comprises: feeding substantially dried and size-reduced biomass (10) which contains an amount of moisture, preferably between 8 wt. % to 12 wt. %, into the densification stage (500) to produce densified biomass in the form of pellets or briquettes; discharging the densified biomass out of the densification stage (500) to the first treatment stage (800), which comprises heating the densified biomass containing moisture to a pre-torrefaction temperature, preferably ranging from 260 to 300° C., and for a first residence time, wherein the densified biomass containing moisture is substantially and completely dried by evaporating the moisture in the first treatment stage (800) and the densified biomass is at least partially torrefied to form the pre-torrefied biomass after said first treatment stage (800). After that, the pre-torrefied biomass is discharged out of the first treatment stage (800) to the second treatment stage (900), which comprises heating the pre-torrefied biomass supplied to the second treatment stage (900) at a temperature preferably ranging from 240 to 280° C. and for a second residence time in order to form a torrefied biomass (20); discharging the torrefied biomass (20) out of the second treatment stage (900) via a biomass discharge device (70) and a gas sealed valve outlet (25) to the cooling treatment stage (600). There is also a heat exchange step (700) carried out by a heat exchange using the flue gas (12) from the combustion burner for heating up a portion of recuperated hot gas after being subjected to the first and second treatment stages in order to re-introduce those recuperated hot gas into the first and second treatment stages. The flue gas (12) out of the heat exchange could also provide heat to other stages (701) such as prior to said densification stage (500), the flue gas heat from the heat exchange step (700) can be used for reducing the moisture content of the biomass to a range of 8 wt. % to 12 wt. % before the introducing to the densification step of pelletizing or briquetting.

Preferably, the first treatment stage (800) and the second treatment stage (900) of the present process is performed in the same treatment chamber. Carrying out the first and second treatment stages in the same treatment chamber can lower the energy required for torrefaction of biomass according to the present process while using the same amount of time and temperature relative to any conventional methods. Same amount of energy as in the conventional methods can be used while the amount of time and temperature for torrefaction of biomass can be lowered according to the present process. Overall, the present process can at least save energy, time and temperature used for torrefaction of biomass as compared to conventional methods, leading to cost reduction.

Figure 3:
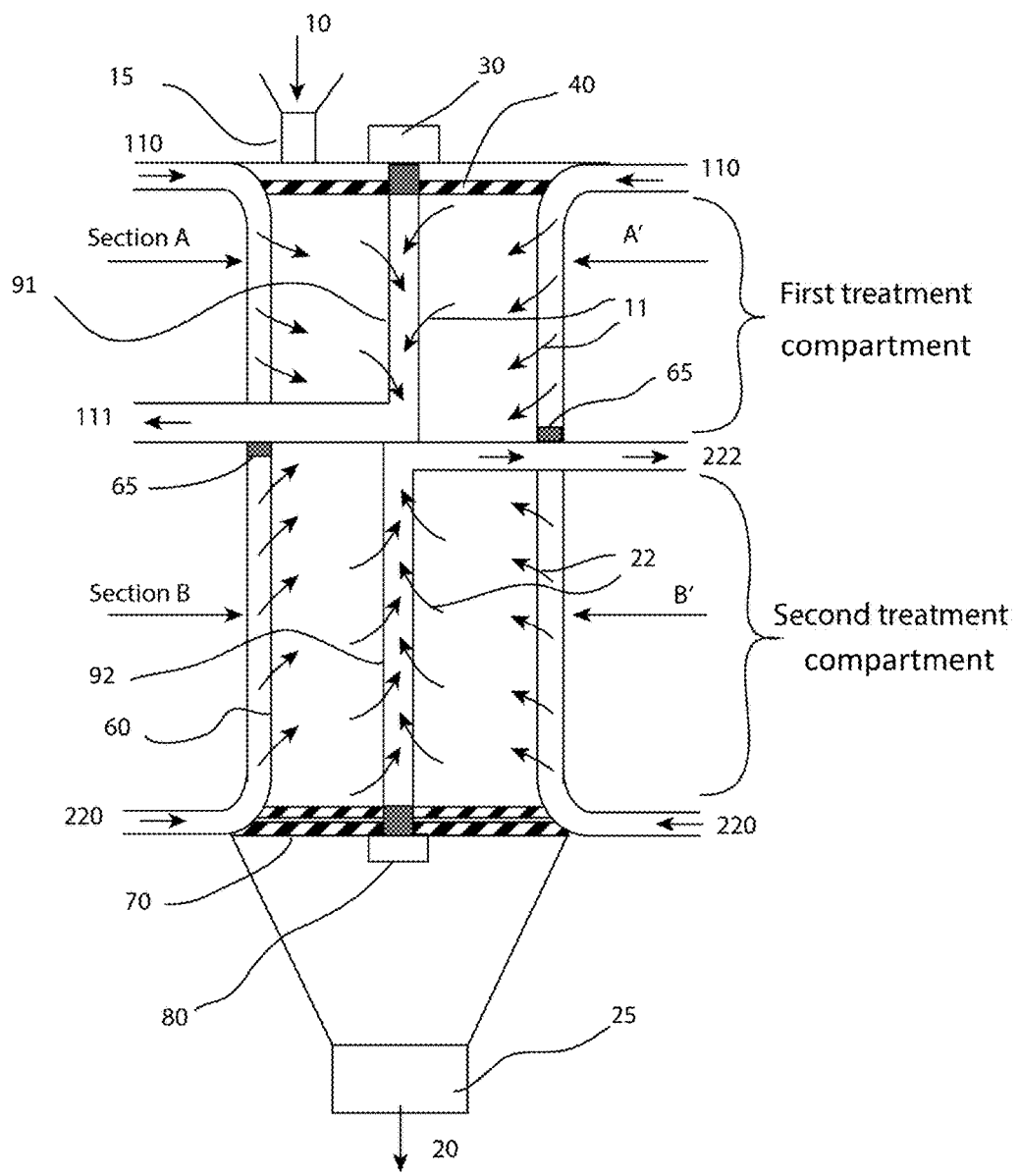
FIG. 3 is a schematic diagram showing the structure and flow of different materials in the present apparatus according to an embodiment of the present invention, in which the direction of the flow of different materials are represented by arrows.

During the first treatment stage (800) and the second treatment stage (900) of the present process, the corresponding continuous or batch biomass treatment system or apparatus comprises at least one first hot gas inlet (110) and at least one first hot gas outlet (111); and at least one second hot gas inlet (220) and at least one second hot gas outlet (222), as shown in FIG. 3, for the respective first hot gas and second hot gas to flow in and out of the respective treatment compartments of the apparatus.

In FIG. 3, the first hot gas (11) from the first hot gas inlet (110) in the first treatment compartment where the first treatment stage is carried out is brought into direct contact with the substantially dried and densified biomass from the densification stage via a gas sealed valve inlet (15), wherein said first hot gas comprises equal to or less than 10% by volume of oxygen. The second hot gas (22) from the second hot gas inlet (220) in the second treatment compartment where the second treatment stage is carried out is brought into direct contact with the pre-torrefied biomass from the first treatment stage, wherein said second hot gas comprises equal to or less than 3% by volume of oxygen.

At least a portion (11a) of the first hot gas (11) out of the first hot gas outlet (111) of the first treatment compartment containing volatile combustible gas is re-circulated to the combustion burner (400) for producing a flue gas (12) which is heating up a portion of the recuperated first hot gas (11) via a heat exchange to be re-introduced into the first treatment compartment. Similarly, at least a portion (22a) of the second hot gas (22) out of the second hot gas outlet (222) of the second treatment compartment containing volatile combustible gas is re-circulated to the combustion burner (400) for producing a flue gas (12) which is for heating up a portion of the recuperated second hot gas (22) via a heat exchange to be re-introduced into the second treatment compartment.

Since the first treatment stage is used to completely dry out all remaining moisture in the densified biomass (10), thus the first residence time of biomass in the first treatment stage is equal to or shorter than the second residence time of the second treatment stage at which the actual torrefaction is performed.

In order to dry out the remaining moisture of the relatively colder densified biomass (10) in the first treatment stage quickly, the temperature of the first hot gas (11) at the first hot gas inlet(s) (110) in the first treatment stage is set to be equal to or higher than the temperature of the second hot gas (22) at the second hot gas inlet(s) (220) in the first treatment stage. The temperature of the first hot gas and second hot gas at the first hot gas inlet(s) and the second hot gas inlet(s) can be respectively monitored and controlled by the control and monitoring device (300 in FIG. 2B).

The torrefied biomass out of the second treatment stage is then cooled down at the cooling stage (600) to a temperature below 100° C., preferably to about room temperature (e.g. 25° C.) since hot torrefied pellets or briquette is reactive. The cooling stage is carried out by bringing the torrefied biomass into direct contact with a coolant gas or by bringing the torrefied biomass into direct contact with water.

FIG. 3 provides a continuous or batch compact moving bed reactor type apparatus for treating biomass according to the process of the present invention. Said apparatus comprises a treatment chamber having a double-walled housing, and is preferably in an annular form, which defines a substantially vertical axis. Between an outer wall and inner wall of the double-walled housing, an inner peripheral gap is defined. Said treatment chamber comprises a supply of biomass (10) from the top of the treatment chamber via at least one gas sealed valve inlet (15), at least one biomass distribution device (40), a biomass discharge device (70) for evenly discharging torrefied biomass particles at the bottom of the treatment chamber, at least one final toadied biomass outlet via at least one gas sealed valve outlet (25), at least one first hot gas inlet (110) and at least one first hot gas outlet (111) for the first treatment stage, at least one second hot gas inlet (220) and at least one second hot gas outlet (222) for the second treatment stage, an inner perforated wall (60) of the double-walled housing of the treatment chamber, a hot gas distribution system comprising a plurality of perforated double separation plates (62) arranged in a star or spider or ring form in the treatment chamber, at least one perforated duct (91, 92) being disposed in the middle of the treatment chamber, wherein the inner perforated wall (60), the perforated double separation plates (62) and the perforated duct (91, 92) raise from the bottom to the top of the treatment chamber along the vertical axis, and wherein a first hot gas (11) is supplied to at least one first hot gas inlet (110), preferably mounted in the top of the first treatment compartment, forced along the inner peripheral gap of the double-walled housing and the gap of the perforated double separation plates (62) arranged in a star or spider or ring form to heat up evenly all the densified biomass (10) in the first treatment compartment and finally recuperated through the perforated duct (91) disposed in the middle of the treatment chamber and discharged by at least one first hot gas outlet (111), preferably mounted in the bottom of the first treatment compartment. Similarly, a second hot gas (22) is supplied to at least one second hot gas inlet (220), preferably mounted in the bottom of the second treatment compartment, forced along the inner peripheral gap of the double-wall housing and the gap of the perforated double separation plates (62) arranged in a star or spider or ring form to heat up evenly all pre-torrefied biomass in the second treatment compartment and finally recuperated through the perforated duct (92) disposed in the middle of the treatment chamber and discharged by at least one second hot gas outlet (222), preferably mounted in the top of the second treatment compartment.

Depending on the production scale, a number of double-walled structures, preferably in annular form, can be further introduced into the treatment chamber. In the case of a larger production scale, inside the double-walled housing of the treatment chamber, additional double-walled structure(s) in annular form comprising an outer and inner walls (either one or both walls can be perforated) defining an inner gap for other hot gas inlets to direct hot gas along the inner gap of those additional double-walled structure(s) in annular form and then pass through the outer and inner perforated walls of those double-walled structures to any of the first and second treatment compartments can be introduced. In other words, the present apparatus can be easily scaled up by adding double-walled structures into the treatment chamber. One of the advantages of introducing said double-walled structures is that the hot gas can be efficiently and evenly distributed in the treatment chamber even though the volume of the biomass being treated is increased when the production scale is increased. The cost on scaling up by introducing additional double-walled structures inside the treatment chamber of the present invention is relatively lower than that on modifying any conventional torrefaction reactor to cope with the increasing production scale because the conventional torrefaction reactor is usually restricted by its shape and design during modification. The present apparatus has another advantage over the conventional torrefaction reactor in the case of scale-up is that at least only one perforated duct being disposed in the middle of the treatment chamber along the vertical axis thereof is required for directing the remaining portion of the hot gas out of the treatment chamber, even though a number of double-walled structures for directing more hot gas into the treatment chamber is introduced, suggesting that a cost on modification based on the design of the present apparatus can be significantly reduced. Also, in terms of effectiveness, the hot gas can be more evenly distributed inside the treatment chamber by means of introducing this kind of double-walled structures in the case of scale-up, suggesting that the present apparatus is more energy-saving, less time-consuming and maintaining an homogeneous product quality in treating biomass.

Figure 4:
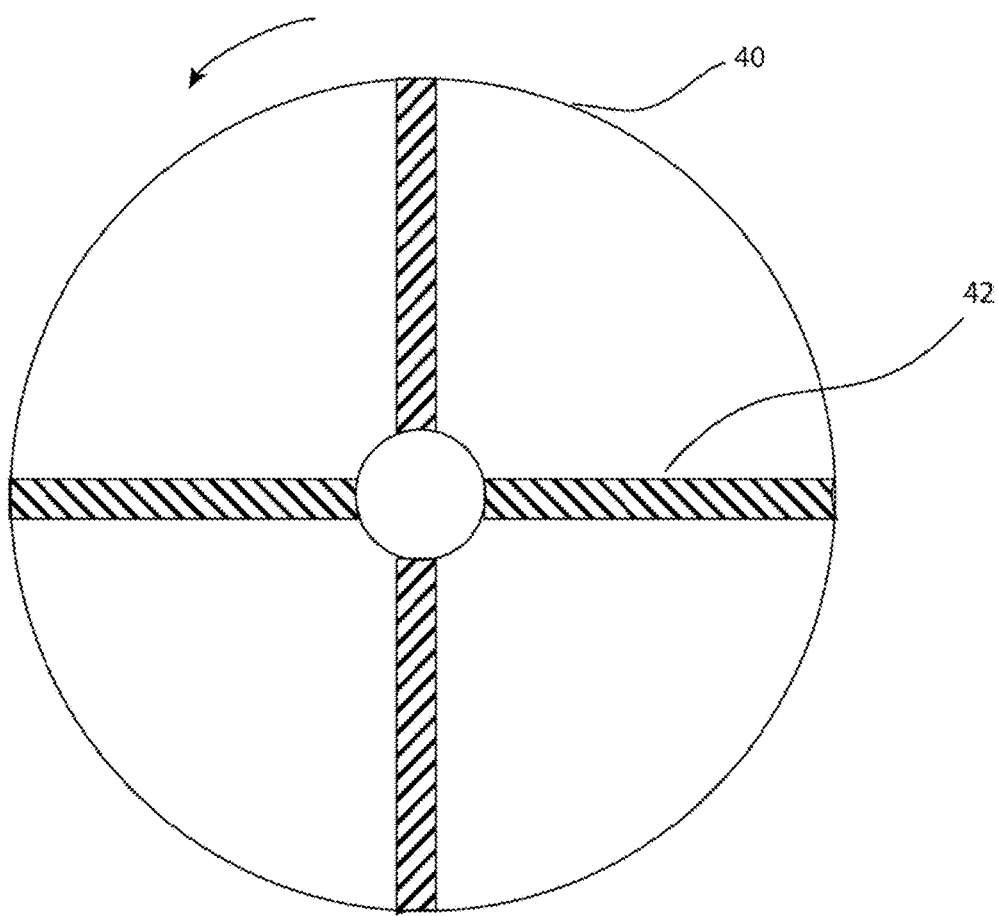
FIG. 4 is a top view of the biomass distribution device from the gas sealed valve inlet of the present apparatus according to an embodiment of the present invention.

FIG. 4 shows one embodiment of the biomass distribution device which has at least one rotary wiper arm (42) mounted on a rotated wiper wheel (40) driven by a motor (30) to distribute evenly the biomass coming from the gas sealed valve inlet (15).

In order to separate the first hot gas (11) and the second hot gas (22), between the double-walled housing of the first treatment compartment and the double-walled housing of the second treatment compartment, there is provided a non-perforated gas partition plate (65).

For the stability of the construction, the perforated double separation plates (62) arranged in a star or spider form which at least one first end is connected to the perforated duct (91, 92) in the middle of the treatment chamber.

For the stability of the construction, the perforated double separation plates (62) arranged in a star or spider form which at least one second end is connected to the inner perforated wall (60) of the treatment chamber.

Figure 6A:
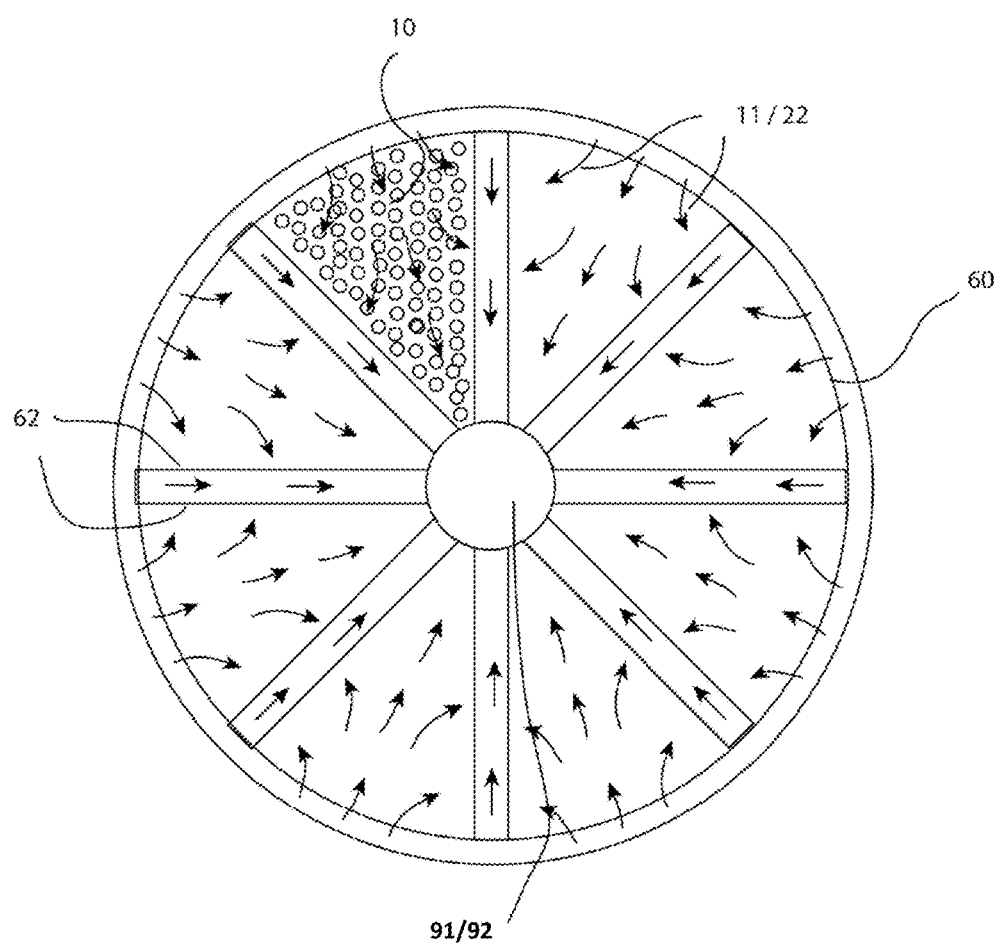
FIG. 6A is a cross-sectional view (section A-A' or section B-B' in FIG. 3) of the perforated double separation plates showing a star formic hot gas distribution system in the present apparatus or used in the present process.
Figure 6B:
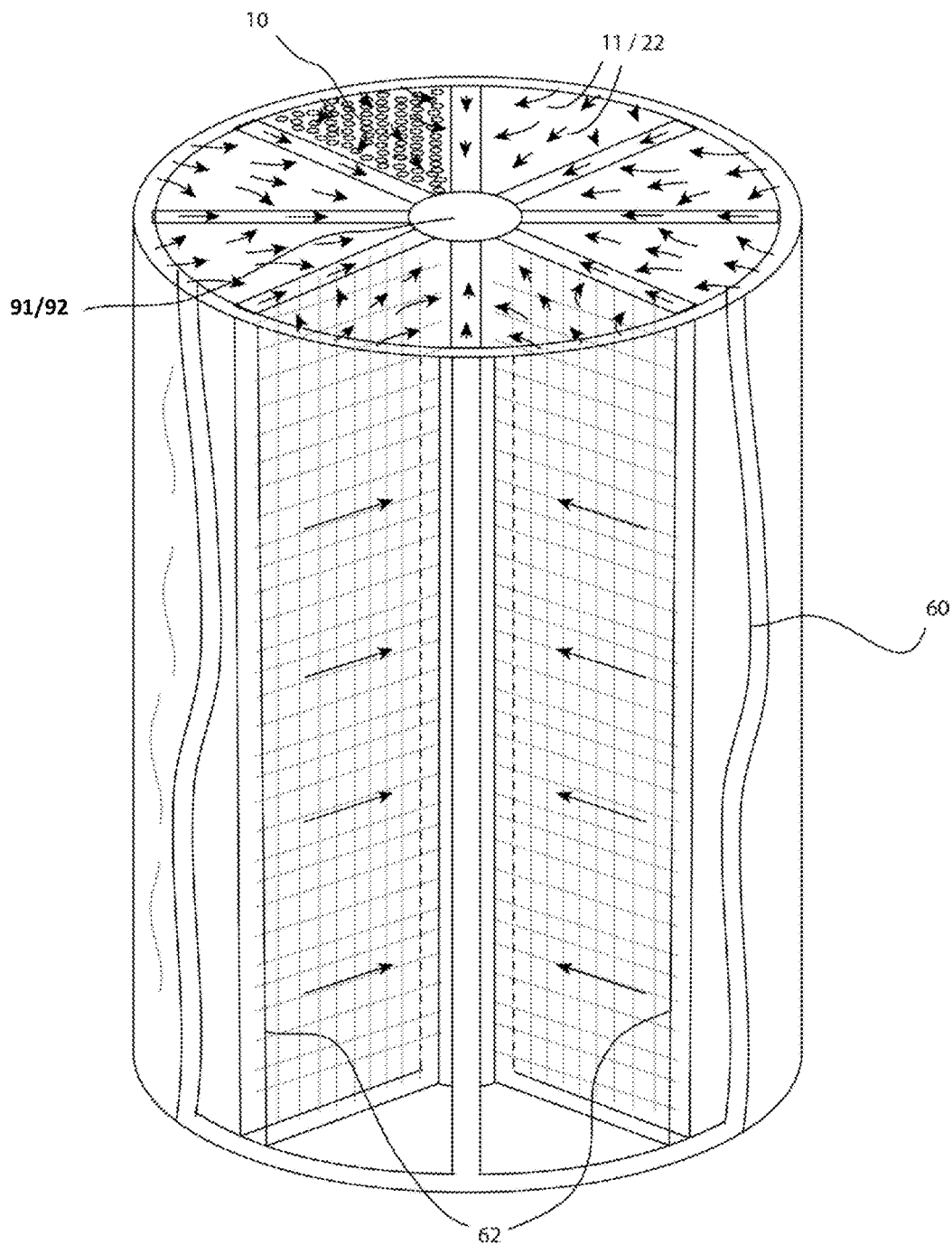
FIG. 6B is a perspective view of the perforated double separation plates showing a star formic hot gas distribution system of the present apparatus or used in the present process.
Figure 7A:
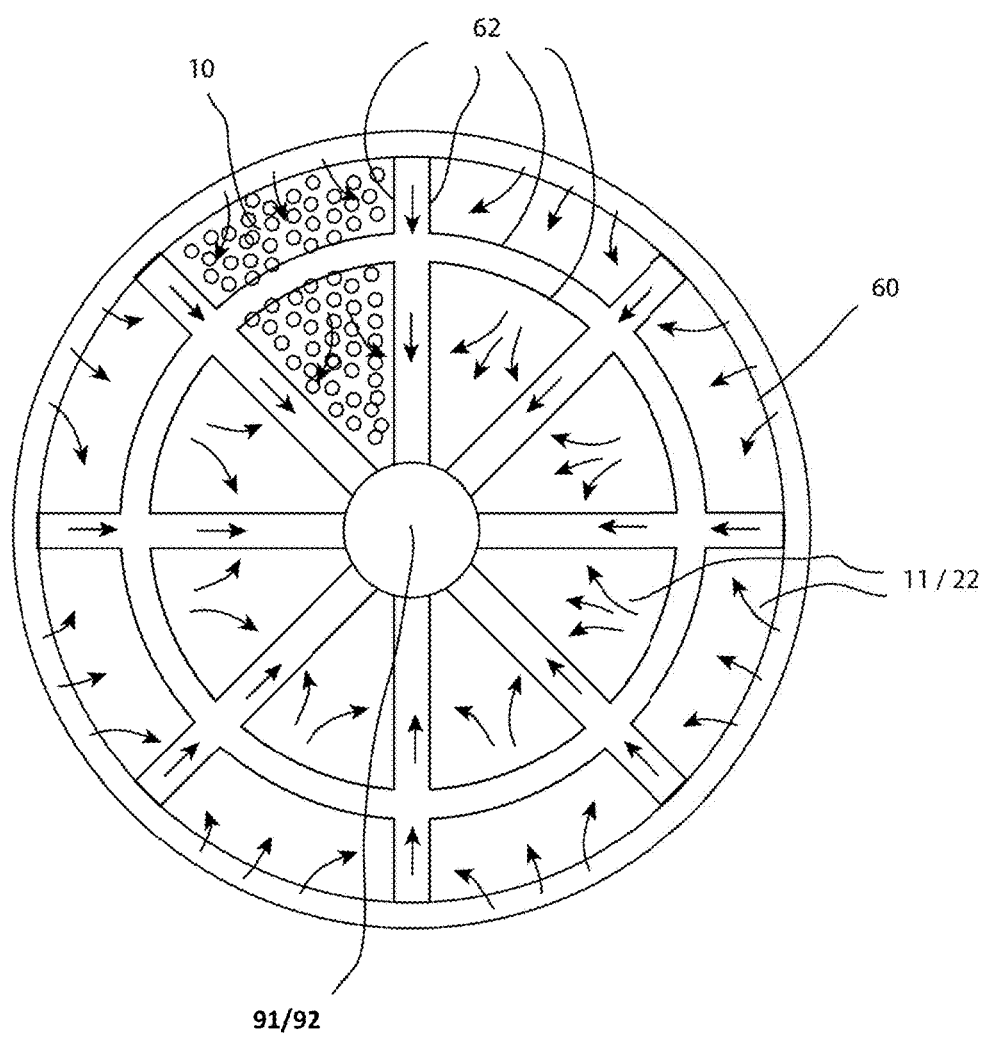
FIG. 7A is a cross-sectional view (section A-A' or section B-B' in FIG. 3) of the perforated double separation plates showing a spider formic hot gas distribution system in the present apparatus or used in the present process.
Figure 7B:
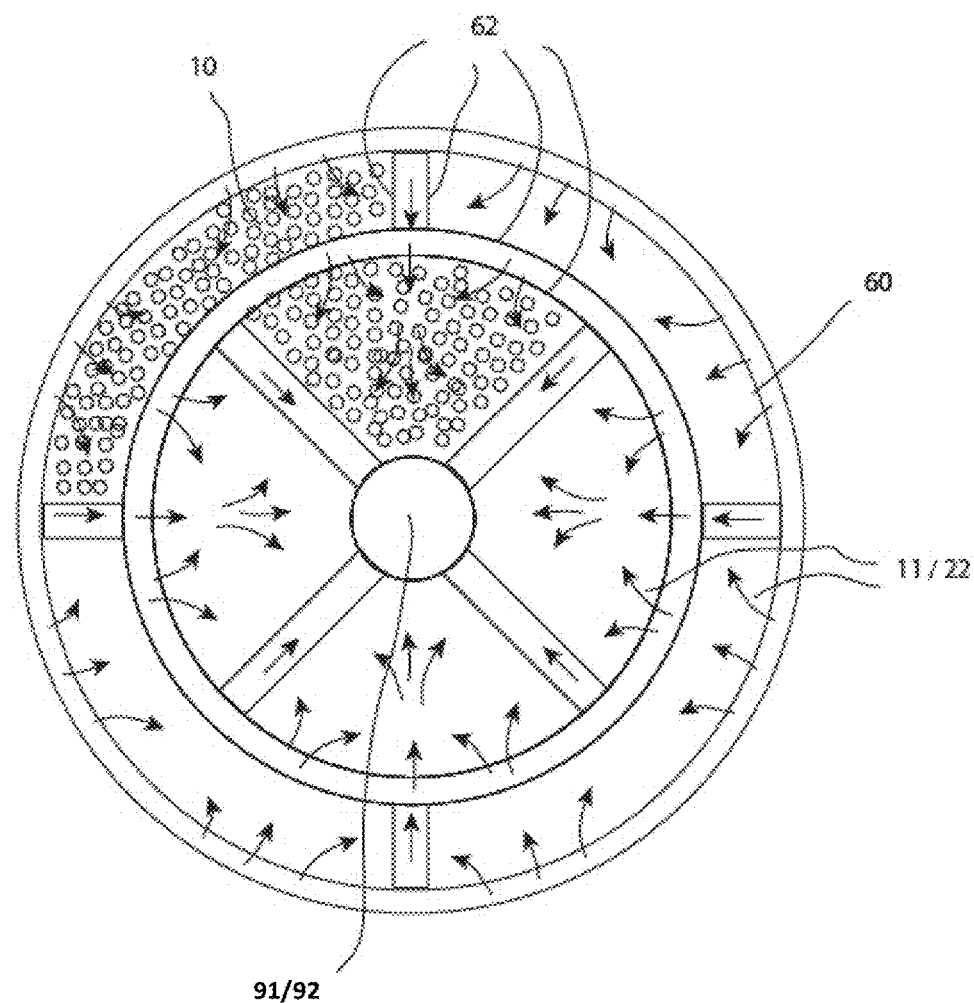
FIG. 7B is a cross-sectional view (section A-A' or section B-B' in FIG. 3) of the perforated double separation plates showing another spider formic hot gas distribution system in the present apparatus or used in the present process.
Figure 8:
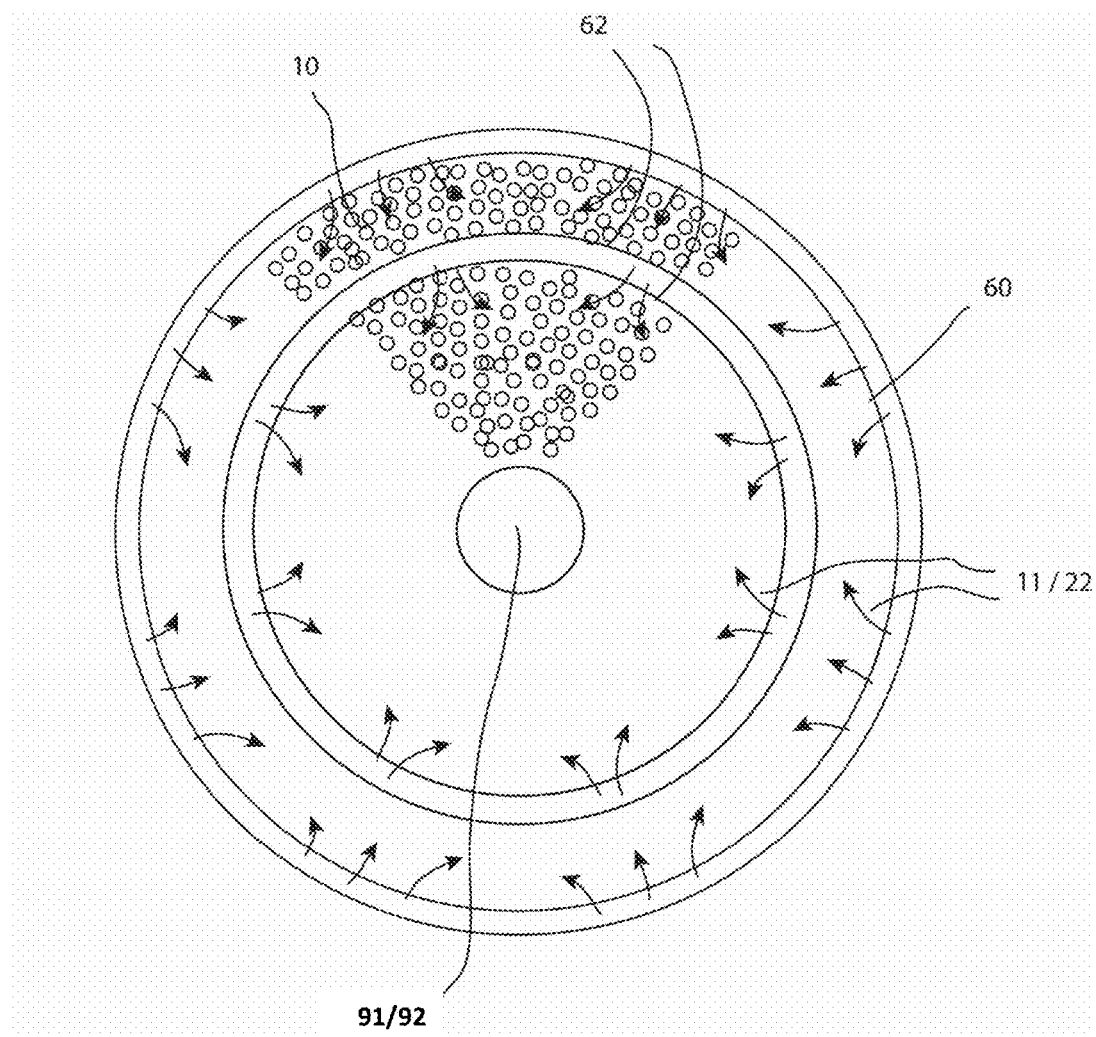
FIG. 8 is a cross-sectional view (section A-A' or section B-B' in FIG. 3) of the perforated double separation plates showing a ring formic hot gas distribution system in the present apparatus or used in the present process.

FIGS. 6A, 6B, 7A, 7B and 8 show a star, spider or ring formic hot gas distribution treatment chamber, respectively, wherein the perforated double separation plates (62) are disposed to divide the treatment chamber into at least two substantially vertical sections. As shown in FIG. 6A and FIG. 6B, the perforated double separation plates (62) in a star form divides the treatment chamber (including the first and second treatment compartments) into eight vertical sections surrounding the perforated duct (91, 92) being disposed in the middle of the treatment chamber along the vertical axis. As shown in FIG. 7A, the perforated double separation plates (62) in a spider form divides the treatment chamber into sixteen vertical sections; whereas in FIG. 7B, the perforated separation plates (62) in another spider form divides the treatment chamber into eight vertical sections. In FIG. 8, the perforated double separation plates (62) divide the treatment chamber into two vertical sections where one vertical section is surrounded by another vertical section.

Figure 9:
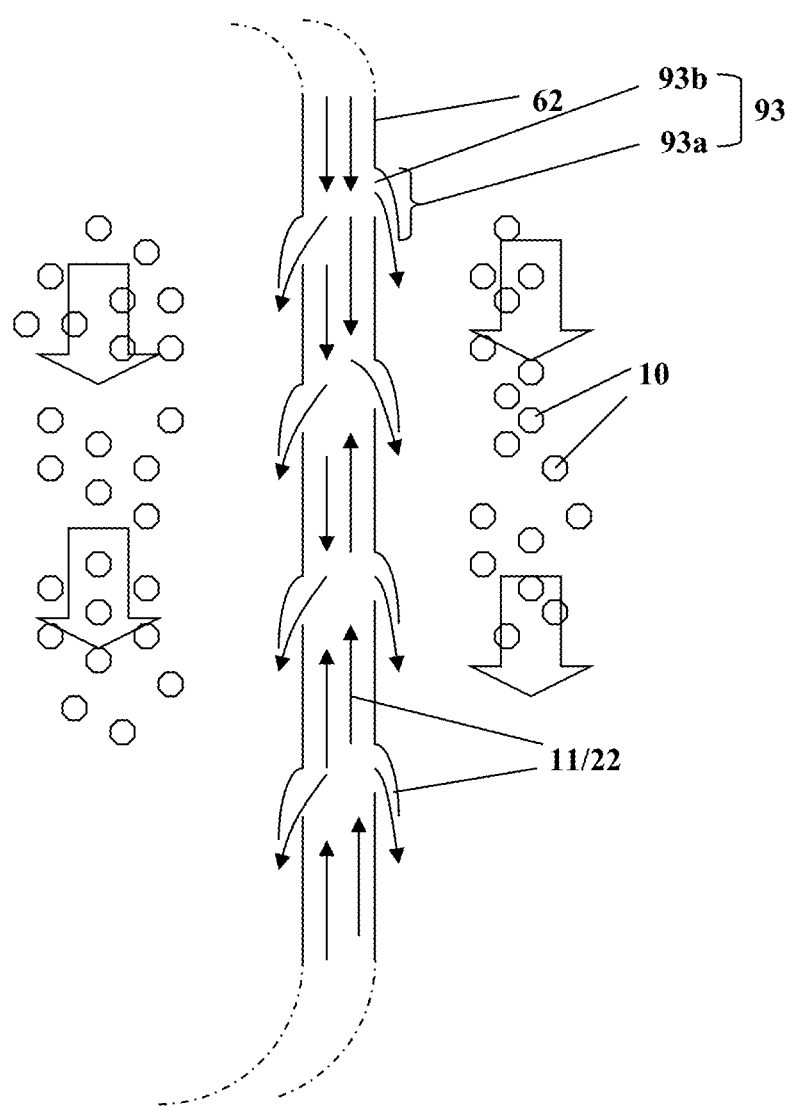
FIG. 9 is a schematic diagram showing the structure of the perforations of the inner perforated double separation plates according to an embodiment of the present invention.

The biomass (10) moves from the first treatment stage to the second treatment stage by means of gravity in order to eliminate any mechanical or pneumatic part in between, thereby saving maintenance, energy, time and cost. When the pre-torrefied biomass moves from the first treatment compartment to the second treatment compartment in the treatment chamber of the present apparatus, it passes through the vertical space of the perforated double separation plates. In order to avoid blockage of any perforations of the perforated double separation plate (62) by the biomass during passage, the perforations are designed in a way that only allows hot gas (11, 22) to flow through while the biomass (10) cannot. One of the embodiments of the perforated double separation plates with this kind of perforations is shown in FIG. 9. The solid arrows represent the flow of hot gas and the unshaded arrows represent the direction of the biomass moving from the first treatment compartment to the second treatment compartment inside the treatment chamber. In the embodiment as shown in FIG. 9, the perforations (93) are configured to only allow gas to flow in or out of the gap of the perforated double separation plates while biomass or other solid are not allowed to get through those perforations. To have such configuration, a cap-like structure may be created, like the slightly curved projections (93a) extended from the wall of the perforated double separation plates, by opening up part of the wall of the perforated double separation plates such that the perforation is substantially gas permeable but impermeable to biomass or other solid. Also, the slightly curved projections so created by opening up the wall of the perforated double separation plates in that embodiment can be projected in a direction such that the pore-like opening (93b) which is only gas permeable is faced to a direction which the biomass movement from the first treatment compartment to the second treatment compartment is blocked by the projections (93a), further reducing the chance of biomass to get through the perforations (93a) of the perforated double separation plates. Said perforations are preferably made by stamping and punching out a sheet of metal material which forms said wall of the perforated double separation plates. This kind of perforations can also be applied to other parts of the present invention which require perforations to allow hot gas to flow in and/or out of the treatment chamber, e.g., the perforated duct or the inner perforated wall.

For the first treatment stage of pre-torrefaction for drying out quickly the remaining moisture in the biomass (10), the first hot gas (11) could tolerate an oxygen concentration at most 10% oxygen on a volume basis without self-initiating the internal combustion of biomass, even at direct contact with the first hot gas (11) of temperature of 260-300° C. On the contrary, when the completely dried out biomass entering into the second treatment stage, oxygen concentration needs to be contained at most 3% oxygen on a volume basis in order to avoid self-combustion of biomass at direct contact with the second hot gas (22) of temperature of 240-280° C. The temperature of the second treatment stage is set to equal to or lower than the temperature of the first treatment stage in order to better control the mass and energy balance of the torrefied biomass, as well as to avoid carbonization incidence.

For energy conservation of the torrefaction process to save external fuel in an auto-thermal mode, at least a portion of the first hot gas (11) out of the first treatment stage containing volatile combustible gas is re-circulated to the combustion burner (400) for producing the flue gas (12) which is for heating up the first hot gas (11) via a heat exchange to be re-introduced into the first treatment compartment where the first treatment stage is carried out and at least a portion of the second hot gas (22) out of the second treatment stage containing volatile combustible gas is re-circulated to the combustion burner (400) for producing the flue gas (12) which is for heating up second hot gas (22) via a heat exchange to be re-introduced into the second treatment compartment where the second treatment stage is carried out. Said one or more heat exchange(s) can be the same or different for said flue gas which is for heating up the first hot gas and said second hot gas, respectively. In this way, no additional external fuel is required to continuously heat up the first and second hot gas for said first and second treatment stages or said first and second treatment compartments such that a self-sustained process or apparatus for treating biomass is provided.

Since the top down transfer of biomass (10) from the gas sealed valve inlet (15) to the gas sealed valve outlet (25) is by gravity, thus the residence time of the biomass in the treatment chamber is proportional to the height of the corresponding treatment compartments of the treatment chamber. The first treatment stage, just mainly for drying out completely the moisture in the densified biomass, could be performed within a residence time which is equal to or shorter than the residence time of the torrefaction process in the second treatment stage, thus the height of the first treatment compartment where the first treatment stage is carried out is equal to or shorter than the height of the second treatment compartment where the second treatment stage is carried out.

Figure 5A:
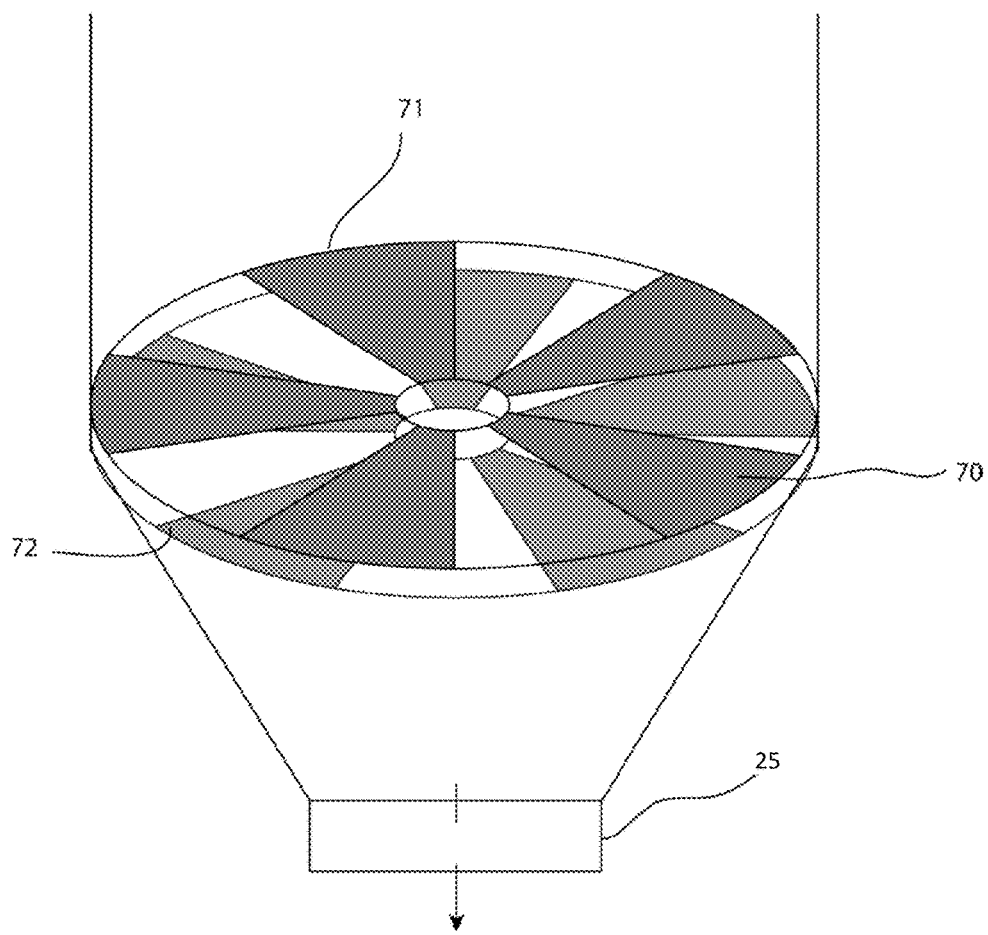
FIG. 5A is a perspective view of the biomass discharge device of the present apparatus according to an embodiment of the present invention.
Figure 5B:
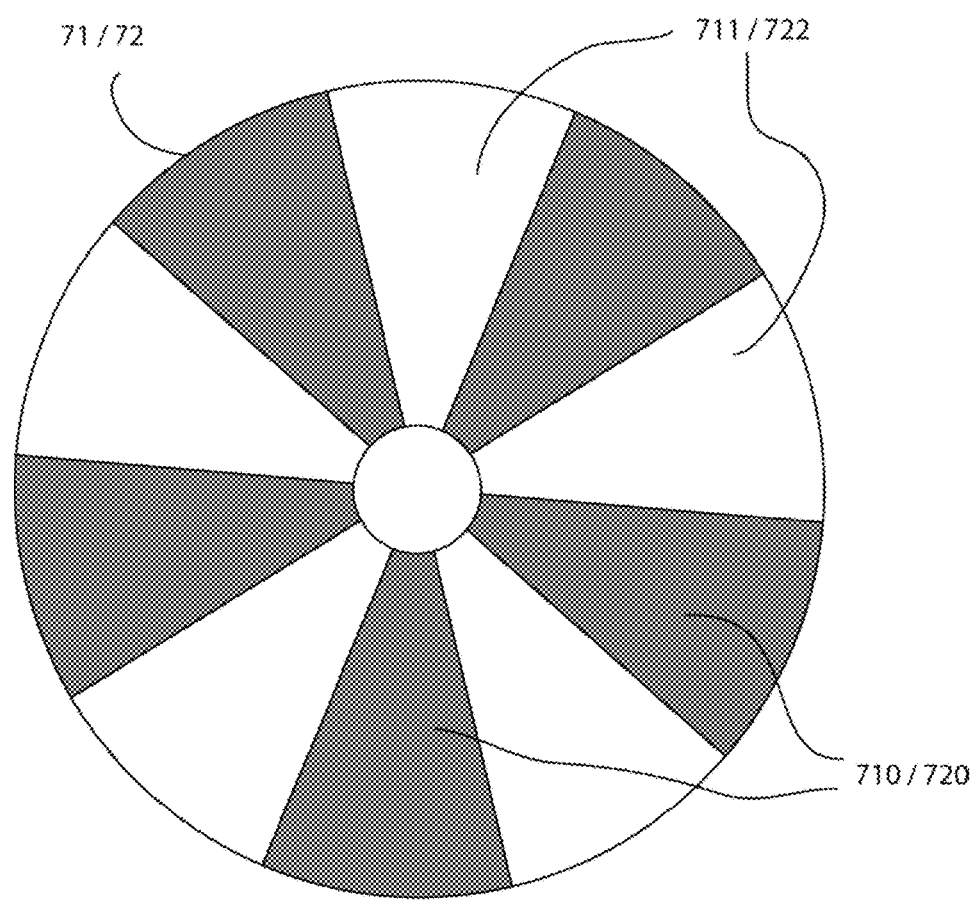
FIG. 5B is a schematic diagram showing structure of two coaxed disks of the biomass discharge device of the present apparatus according to an embodiment of the present invention, in which the shaded parts represent blocks while the unshaded parts represent openings of each disk.

In order to give even residence time for each pellet or briquette going through the first and second treatment stage, a special designed biomass discharge device (70) should be implemented. FIGS. 5A and 5B show one embodiment of the biomass discharge device comprising two coaxed rotated disks (71 and 72) driven by at least one rotation motor (80), wherein each disk has star formic multiple openings (711 or 722) and multiple blocks (710 or 720) arranged alternatively, and wherein the two disks rotate in the same or a counter direction to each other and/or at the same or different speed in order to discharge evenly all torrefied biomass from the second treatment chamber according to a controlled output rate.

In order to effectively control and monitor the whole densification and torrefaction system, a control system (300) having sensors and control devices is installed for monitoring and controlling the actual moisture content, the actual oxygen content and the actual temperature in the treatment chamber to ensure that all parameters are conformed with the predetermined torrefaction conditions.

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

INDUSTRIAL APPLICABILITY

The present process is useful and energy efficient in treating biomass and other equivalent solid waste, especially woody/agricultural biomass/solid waste by performing densification stage first in the form of homogeneous pellets or briquettes before torrefaction stage to cope with MISO principle, thus it has eliminated most of the problems associated with post-densification of torrefied biomass, including but not limited to using binders. In addition, the present apparatus not only is for implementing the present process but is also applicable to other treatment processes such as processes requiring an even distribution of input elements, a real-time controlled and monitored treatment chambers with the continuous supply of re-circulating hot gas, and/or an even discharging of the end products. The present apparatus is also suitable for treating elements such as coffee beans or other agricultural/non-agricultural materials which requires a real-time control of oxygen, temperature, residence time and homogeneity for thermal and thermal chemical treatment process.

What is claimed is:
1. A biomass treatment apparatus comprising:
a treatment chamber having a double-walled housing;
at least one gas sealed valve inlet being disposed at the top of said treatment chamber for feeding biomass into said treatment chamber;
at least one gas sealed valve outlet being disposed at the bottom of said treatment chamber for discharging final product from said treatment chamber;
a biomass distribution device for evenly distributing biomass from said gas sealed valve inlet(s);
wherein said treatment chamber comprises:
a first treatment compartment and a second treatment compartment where pre-torrefaction and torrefaction of biomass are carried out, respectively;
at least one first hot gas inlet and at least one first hot gas outlet being disposed at the top and bottom of said first treatment compartment for a first hot gas being provided to and discharged from said first treatment compartment, respectively;
at least one second hot gas inlet and at least one second hot gas outlet being disposed at the bottom and top of said second treatment compartment for a second hot gas being provided to and discharged from said second treatment compartment, respectively, and
wherein said treatment chamber comprises an outer wall and an inner perforated wall forming said double-walled housing, an inner peripheral gap defined between said outer wall and said inner perforated wall, a plurality of perforated double separation plates forming a hot gas distribution system, a perforated duct being disposed in the middle of said treatment chamber, wherein said inner perforated wall, each of said plurality of perforated double separation plates and said perforated duct continuously raise from a bottom to a top of said treatment chamber along a vertical axis of the treatment chamber, and each of said plurality of perforated double separation plates is arranged radially outward of the perforated duct with one end thereof connected to the perforated duct and the other end thereof connected to the inner perforated wall, such that each of said plurality of perforated double separation plates is unmovable with respect to the perforated duct and the inner perforated wall, and wherein each of the at least one first hot gas inlet and the at least one second hot gas inlet is open to the inner peripheral gap and gaps of a plurality of perforated double separation plates such that the first hot gas and the second hot gas supplied from the at least one first hot gas inlet and the at least one second hot gas inlet, respectively, pass through the inner peripheral gap and the gaps of the plurality of perforated double separation plates and flow laterally and radially through the perforations toward said biomass moving from top to bottom by gravity.

2. The apparatus of claim 1, wherein said first hot gas is provided via said first hot gas inlet(s) to said first treatment compartment and then forced along said inner peripheral gap of the double-walled housing and the gaps of the plurality of perforated double separation plates in order to heat up evenly the biomass being fed into the treatment chamber via said gas sealed valve inlet(s) to a pre-torrefaction temperature.

3. The apparatus of claim 1, wherein said second hot gas is provided via said second hot gas inlet(s) to said second treatment compartment and then forced along said inner peripheral gap of the double-walled housing and the gaps of the plurality of perforated double separation plates in order to heat up evenly the biomass from said first treatment compartment to a torrefaction temperature.

4. The apparatus of claim 1, wherein said biomass distribution device comprises at least one rotary wiper arm mounted in a rotated wiper wheel driven by a motor to distribute evenly the biomass coming from the gas sealed valve inlet(s).

5. The apparatus of claim 1, wherein said gap of double-walled housing and the perforated double separation plates of said first treatment compartment and said second treatment compartment are separated by a non-perforated partition plates.

6. The apparatus of claim 1, wherein said perforated double separation plates comprises at least one first end connected to said perforated duct being disposed in the middle of the treatment chamber.

7. The apparatus of claim 1, wherein said perforated double separation plates further comprises at least one second end connected to said inner perforated wall.

8. The apparatus of claim 1, wherein said perforated double separation plates is disposed in said treatment chamber to divide said treatment chamber into at least two vertical sections.

9. The apparatus of claim 1, further comprising a control device for real-time controlling and monitoring conditions including temperature, moisture, flow rate, oxygen content, residence time in different parts of said apparatus to ensure said conditions are maintained at pre-determined level.

10. The apparatus of claim 1, wherein a pre-determined temperature used in said first treatment compartment ranges from 260 to 300° C.

11. The apparatus of claim 1, wherein a pre-determined temperature used in said second treatment compartment ranges from 240 to 280° C.

12. The apparatus of claim 1, wherein said second treatment compartment has a torrefaction temperature equal to or lower than a pre-torrefaction temperature of said first treatment compartment.

13. The apparatus of claim 1, wherein said second treatment compartment has a height equal to or taller than that of said first treatment compartment.

14. The apparatus of claim 1, wherein said biomass is resided in said first treatment compartment for a time duration equal to or shorter than that in said second treatment compartment.

15. The apparatus of claim 14, wherein said time duration for said biomass being resided in said first and second treatment compartments is dependent on the relative height of said first and second treatment compartments and/or an output rate of said biomass controlled by said gas sealed valve outlet.

16. The apparatus of claim 1, further comprising a combustion burner and one or more heat exchange(s) for re-circulating a portion of said first hot gas and said second hot gas containing volatile combustible gas from said biomass after being discharged from said first treatment compartment and said second treatment compartment via said first hot gas outlet(s) and said second hot gas outlet(s), respectively, using said remaining portion of said first hot gas and said second hot gas containing volatile combustible gas to produce in said combustion burner a flue gas which is for heating up a portion of said first hot gas and a portion of said second hot gas to be provided to said first treatment compartment and said second treatment compartment, respectively, via said one or more heat exchange(s).

17. The apparatus of claim 1, wherein said first treatment compartment is kept at an oxygen level equal to or less than 10% by volume of said first hot gas.

18. The apparatus of claim 1, wherein said second treatment compartment is kept at an oxygen level equal to or less than 3% by volume of the said second hot gas.

19. The apparatus of claim 1, wherein said perforated double separation plates are arranged in a star or spider or ring form.

20. The apparatus of claim 1, wherein said biomass after said pre-torrefaction in said first treatment compartment is moved by gravity to said second treatment compartment for torrefaction.

21. The apparatus of claim 1, wherein said inner perforated wall, said plurality of perforated double separation plates, and/or said perforated duct comprises perforations which are configured to be only permeable to gas but impermeable to said biomass or other solids such that said first and second hot gas are provided to said first and second treatment compartments efficiently and are evenly distributed inside said first and second treatment compartments.

22. The apparatus of claim 21, wherein each of said perforations comprises a projection extended from the wall of said inner perforated wall, said plurality of perforated double separation plates, and/or said perforated duct by opening up part of the wall such that the projection defines an opening which are faced in a direction that the biomass is blocked by said projection.

23. The apparatus of claim 22, wherein said opening up part of the wall of said inner perforated wall, said plurality of perforated double separation plates, and/or said perforated duct in order to form said plurality of perforations comprising said projections are carried out by stamping and punching out a sheet of metal material.

24. A process of using the biomass treatment apparatus according to claim 1 for treating biomass, comprising the following stages:
- a densification stage;
- a first treatment stage;
- a second treatment stage; and
- a cooling treatment stage,
    wherein said densification stage comprises feeding substantially dried and size-reduced biomass containing an amount of moisture to said continuous or batch biomass treatment apparatus, densifying said biomass to form a densified biomass into a form of pellets or briquettes, and discharging said densified biomass which is in the form of pellets or briquettes to said first treatment stage;
    said first treatment stage comprises heating said densified biomass containing said amount of moisture to a pre-torrefaction temperature for a first residence time such that said densified biomass is completely dried by evaporating said moisture through said heating in said first treatment stage to form pre-torrefied biomass, and discharging said pre-torrefied biomass to said second treatment stage;
    said second treatment stage comprises heating said pre-torrefied biomass to a torrefaction temperature for a second residence time to form torrefied biomass, and discharging said torrefied biomass to said cooling treatment stage;
    said cooling treatment stage comprises cooling said torrefied biomass to a cooling temperature;
    the first hot gas and the second hot gas are provided to said first and second treatment stages for reaching said pre-torrefaction and torrefaction temperatures, respectively.

25. The process of claim 24, wherein at least a portion of said first hot gas or said second hot gas after being provided to said first treatment stage or said second treatment stage and containing volatile combustible gas from said pre-torrefied or torrefied biomass is recuperated from said first treatment stage or said second treatment stage to be re-circulated to a combustion burner for producing a flue gas which is for heating up said first hot gas or said second hot gas to be provided to said first treatment stage or said second treatment stage via one or more heat exchange(s).

26. The process of claim 25, wherein said first hot gas is provided to said first treatment stage via at least one first hot gas inlet and the remaining portion thereof after being provided to said first treatment stage is then discharged from said first treatment stage via at least one first hot gas outlet for re-circulation back to said first treatment stage via said one or more heat exchange(s).

27. The process of claim 25, wherein said second hot gas is provided to said second treatment stage via at least one second hot gas inlet and the remaining portion thereof after being provided to said second treatment stage is then discharged from said second treatment stage via at least one second hot gas outlet for re-circulation back to said first treatment stage via said one or more heat exchange(s).

28. The process of claim 24, wherein said second hot gas being provided to said second treatment stage has a temperature being equal to or lower than that of said first hot gas being provided to said first treatment stage.

29. The process of claim 24, wherein said first hot gas and said second hot gas comprise oxygen in different volume percentages.

30. The process of claim 29, wherein said first hot gas comprises oxygen content equal to or less than 10% by volume.

31. The process of claim 29, wherein said second hot gas comprises oxygen content equal to or less than 3% by volume.

32. The process of claim 24, wherein said torrefaction temperature is equal to or lower than said pre-torrefaction temperature.

33. The process of claim 24, wherein said pre-torrefaction temperature ranges from 260 to 300° C.

34. The process of claim 24, wherein said torrefaction temperature ranges from 240 to 280° C.

35. The process of claim 24, wherein said second residence time is equal to or more than said first residence time.

36. The process of claim 24, wherein said cooling temperature is below 100° C.

37. The process of claim 24, wherein said cooling temperature is at about room temperature.

38. The process of claim 24, wherein said cooling is carried out by bringing said torrefied biomass in direct contact with a coolant gas or water.

39. The process of claim 24, further comprising a real-time control and monitor step for controlling and monitoring conditions used in said densification stage, said first treatment stage, said second treatment stage, and said cooling stage, and said conditions comprise temperature, residence time, oxygen content, moisture amount, and/or flow rate of the gas.

40. The process of claim 24, wherein said first and second treatment stages are carried out in the same treatment chamber, and said treatment chamber is a continuous or batch moving bed reactor type.

41. The process of claim 24, wherein said first hot gas and second hot gas are evenly distributed throughout said treatment chamber by a hot gas distribution system.

42. The process of claim 24, wherein said densified biomass is evenly distributed by means of a biomass distribution device prior to said heating of the densified biomass in said first treatment stage.

* * * * *